March 26, 1968 A. H. MADER ET AL 3,375,518
DOPPLER SIGNAL SIMULATOR
Filed Jan. 26, 1967 4 Sheets-Sheet 1

United States Patent Office 3,375,518
Patented Mar. 26, 1968

3,375,518
DOPPLER SIGNAL SIMULATOR
Arthur H. Mader, Mount Vernon, and Stanley King, Larchmont, N.Y., assignors to General Precision Systems Inc., a corporation of Delaware
Filed Jan. 26, 1967, Ser. No. 611,853
9 Claims. (Cl. 343—17.7)

ABSTRACT OF THE DISCLOSURE

An apparatus for simulating the demodulated audio Doppler return resulting from an antenna signature comprising both lobe-switching and beam-switching characteristics. Preselecting a value for $\nu$, the simulated Doppler shift frequency, and utilizing a novel cascaded single sideband modulation technique, discrete frequncies are initially generated at $$\nu \pm \frac{\nu}{8}$$

with suitable circuit logic being provided to alternately switch these frequencies at the simulated lobing frequency rate. The discrete frequency products $$\nu \pm \frac{\nu}{8}$$

are then used to modulate a simulated intermediate frequency $f_{IF}$, yielding $$f_{IF} \pm \nu \pm \frac{\nu}{8}$$

with the upper and lower frequencies surounding $f_{IF}$ being alternately switched at a predetermined rate equal to the beam switching frequency being simulated. Finally, low-pass noise is wrapped around each discrete frequency by a balanced modulator to generate simulated audio Doppler spectra.

Brief summary of the invention

It is well-known that airborne navigational radar equipments of the so-called Doppler type experience an undesirable phenomenon called "calibration shift" when the system in question passes from over land to over water. What actually happens is that the received signal strength decreases suddenly and although the aircraft may be traveling at the same velocity a different Doppler shift frequency is measured by the frequency tracker and as a result an erroneous velocity is read out aboard the aircraft. This undesirable attenuation of the echo signal over water arises from the fact that the amount of microwave energy backscattered toward the transmitting source is a function of the nature of the reflecting terrain. For example, backscattering from land is almost isotropic at all angles of incidence so that the amount of energy received at the source is for all intents and purposes independent of the incidence angle. This is not true, however, when the microwave beam energy is reflected back from a relatively smooth surface such as water. In this case, the backscattering process becomes more specular than isotropic and accordingly, the upstream portions of the transmitted beam which have increasingly greater incidence angles reflect increasingly less signal back toward the source.

One way to minimize "calibration shift" is to switch the transmitted beam back and forth between a fore and an aft overlapping lobe position. By doing this, the ground illumination area common to the switching lobes defines a new, relatively narrow beam segment whose Doppler signal product has negligible attenuation across its bandwidth. Consequently the Doppler spectral return afforded by this narrow beam segment is affected little by the specular nature of a smooth reflecting surface such as water. The problem of "calibration shift," as well as apparatus for lobe-switching the antenna beam in the manner described above are both fully developed in Patent Number 3,113,308 assigned to the assignee of this invention.

This patent also makes it abundantly clear that the frequency tracker in lobe-switched Doppler navigators, rather than measuring the statistical center frequency of the demodulated Doppler spectrum attributed to a single lobe, must instead average the center frequencies of two overlapping lobe returns and track the airthmetic mean therebetween. In essence, then, the frequency tracker actually sees two overlapping spectra or lobes.

This presents a new problem where it is desired to provide means for accurately generating simulated audio Doppler returns for use in testing and calibrating on the ground frequency trackers of the type disclosed in the aforementioned patent. Thus, although simulation apparatus for generating single lobe Doppler echoes is known, devices for accurately simulating the demodulated audio Doppler signals resulting from lobe-switching antenna signatures have heretofore been lacking in the prior art.

Speaking generally then, it is the primary object of this invention to provide efficient and economical means for simulating the dual overlapping Doppler spectral returns produced by lobe-switched microwave antennas.

A further understanding of the invention may be had by studying the following detailed description and drawings associated therewith.

Detailed description of the invention

Figure 1:
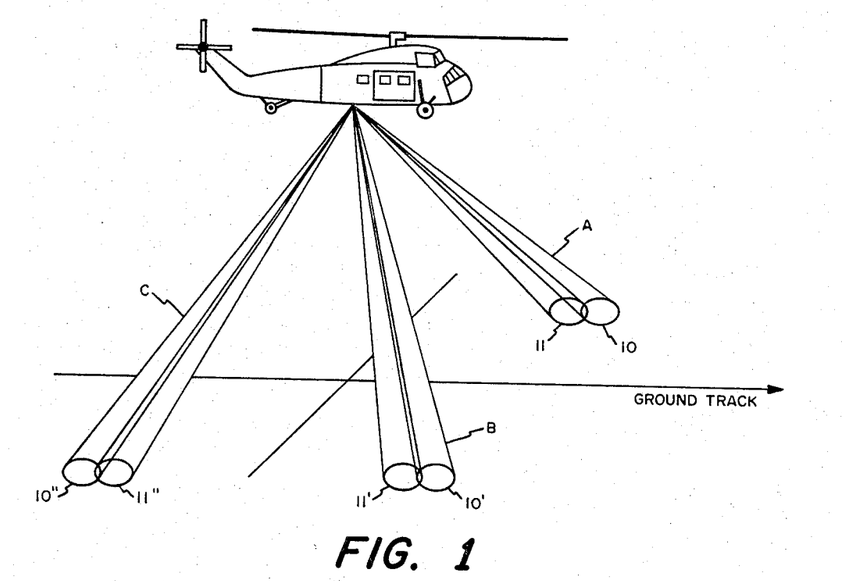
FIG. 1 is a schematic representation of a conventional Doppler radar antenna signature.

FIG. 1 illustrates the antenna signature of a typical Doppler antenna system mounted aboard an aircraft traveling in the direction of ground track. Two beams A and B are directed forwardly astride the ground track and one beam C is directed in the aft direction on the right side relative to ground track as shown.

Although antennas are known in which the beams are generated continuously and simultaneously, it will be assumed for the purpose of illustrating this invention that the beams emanate from a beam-switched antenna. That is, each beam is generated cyclically on a time sharing basis at a suitable switching rate which, by way of example, may be 6 Hz. Likewise, any suitable beam-switching sequence may be employed. However, by way of illustration it will be assumed that the beams appear serially in the following sequence: A, B, C, A, B, C . . . etc. In addition, each beam itself is lobe-switched between a fore and an aft position on the scattering surface at an integrally higher rate than the beaming rate, such as, for example, 18 Hz. The resulting antenna signature will, therefore, generate the ground illumination patterns 10, 11, 10', 11', 10'', 11'' shown respectively in FIG. 1.

Figure 2:
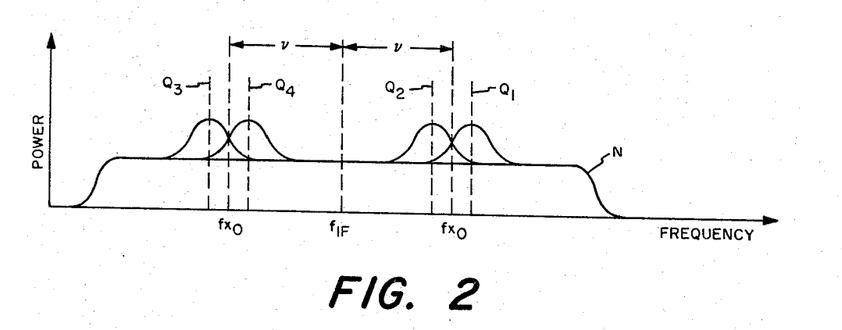
FIG. 2 is a graphical illustration in the frequency domain of the power density function of the domodulated Doppler return derived from the antenna signature of FIG. 1.

FIG. 2 is a graphical representation of the demodulated audio Doppler return derived from the antenna signature of FIG. 1 as seen by the frequency tracker in the frequency domain. Observe that two pairs of overlapping Doppler spectra are symmetrically disposed about the intermediate frequency point $f_{IF}$. Furthermore, both pairs are superimposed upon a broad band of constant amplitude noise designated by reference letter N which noise is always present in the receiver. The rightmost pair of overlapping lobes actually represents the Doppler returns from two of the antenna beams, namely A and B, FIG. 1, since they have identical frequency distributions although occurring at different points in time. The remaining leftmost pair corresponds to the Doppler spectra resulting from beam C, FIG. 1.

With reference to events in the time domain, each lobe associated with each beam will alternately occur at the lobing rate of 18 cycles per second. Inasmuch as the beams are switched at the slower rate of 6 cycles per second, each lobe in each beam pair alternately illuminates the ground before the succeeding beam is generated.

What this suggests in the context of FIG. 2 is that the spectral distribution illustrated therein may be synthesized by electronically switching a simulated lobe about the cross-over point $f_{XO}$ at the lobing frequency rate while at the same time the switching lobe is being electronically alternated above and below the intermediate frequency point $f_{IF}$ at a rate equal to the beam switching frequency. The lobe itself may be derived by folding low-pass noise about a single sideband modulation product located at the discrete frequency corresponding to the statistical center frequency of the lobe being simulated. For example, due to the symmetrical disposition of the lobes about the cross-over point $f_{XO}$ and the intermediate frequency point $f_{IF}$ (FIG. 2) and the fact that the bandwidth of each lobe has been found in practice to be very close to 25% of the statistical center frequency (audio) of each lobe, the discrete center frequencies of the four lobes $Q_1$ to $Q_4$ depicted in FIG. 2 may be expressed generally by the relation $$f_{IF} \pm \left(\nu \pm \frac{\nu}{8}\right) \quad (1)$$

where $\nu$ represents the simulated Doppler shift frequency or the distance on the frequency scale between $f_{IF}$ and the cross-over point $f_{XO}$ associated with each lobe pair. By utilizing a novel cascaded single sideband modulation technique, single sidebands located at frequencies of $\nu+\nu/8$ and $\nu-\nu/8$, respectively, may be initially alternately generated at the lobing frequency rate (18 Hz.). These sidebands may then be employed to modulate $f_{IF}$ at the beam switching rate (6 Hz.) so that ultimately discrete single sideband frequencies may be produced in the following sequence:

$$f_{IF} + \left(\nu + \frac{\nu}{8}\right) \quad (2)$$

$$f_{IF} + \left(\nu - \frac{\nu}{8}\right) \quad (3)$$

$$f_{IF} - \left(\nu - \frac{\nu}{8}\right) \quad (4)$$

$$f_{IF} - \left(\nu + \frac{\nu}{8}\right) \quad (5)$$

with frequencies (2) and (3) appearing twice each in alternation (once for each forward-looking beam) before frequencies (4) and (5) alternately appear once and then the sequence is repeated. Low-pass noise may then be folded (modulated) about each discrete frequency as it is generated to produce the simulated Doppler spectra in accordance with FIG. 2.

Thus, with particular reference now to FIG. 3, the means for generating the aforementioned discrete frequencies will be described. A plurality of voltage sources generally indicated by reference character 20 provide square waves at any one of a plurality of selectable frequencies, namely, $16\nu$, $16\nu_2$ ... $16\nu_N$. The representations $\nu_1 \ldots \nu_N$ are completely general and merely correspond to the particular preselected Doppler shift frequency being simulated. For example, if it is to be assumed that the particular Doppler system being simulated has a calibration constant equal to 10 Hz./knot and $\nu_1$ is equal to 1.8 kHz., then the system according to the invention will simulate a Doppler shift corresponding to a velocity of 180 knots. Likewise, if $\nu_2$ were to be equal to 900 Hz. a Doppler shift corresponding to a velocity of 90 knots may be simulated and so on. Of course, it will be appreciated that any range of values may be chosen for $\nu_1 \ldots \nu_N$ and/or the calibration constant and therefore the invention should not be construed to be limited to the specific values mentioned above as this was done merely by way of illustration. Thus, for the sake of generality, only the term $\nu$ will be used in the ensuing discussion, it being understood that $\nu$ corresponds to the particular preselected Doppler shift frequency being simulated.

Accordingly, a train of square waves having a frequency equal to $16\nu$ is derived from source 20 and fed to element 21. The latter comprises a pair of flip-flops having feedback connections therebetween so that the outputs of each flip-flop are always in quadrature with respect to outputs of the other. In other words, at any given time the output of one flip-flop is 90° out-of-phase with the corresponding output from the other flip-flop. Furthermore, as an incidental result of the inherent operation of the paired flip-flops, the frequency of the latter's outputs are reduced to one-fourth that of its clock input. Keeping this frequency division in mind and resorting to trigonometric terminology to indicate the quadrature phase relations between the respective flip-flop outputs, one of the outputs from either one of the flip-flops may be arbitrarily be assigned the notation sin $4\nu$. This signal is made available on line 22. Likewise, the two outputs of the remaining flip-flop may be represented as $\pm\cos 4\nu$, respectively, since they will either lead or lag sin $4\nu$ by 90°; the latter signals being emitted on lines 23, 24, respectively, as shown. Finally, the remaining output of the quadrature generator 21 is fed into frequency divider 35 via circuit path means 29. Lines 23, 24 then conduct the $\pm\cos 4\nu$ signals into a reversing switch 30 comprising two AND gates and an OR gate arranged in an exclusive OR configuration. Also being fed into the reversing switch are two 18 Hz. split phase square waves extracted from a suitable source means represented by reference character 26. It will be appreciated by those skilled in the art that an exclusive OR gate having the above mentioned signals applied to it will function to reverse the phase of the higher frequency input at a rate equal to the frequency of the lower frequency input. Therefore, the $+\cos 4\nu$ and $-\cos 4\nu$ signals will alternately appear on line 25 at the rate of 18 Hz. whereas only the sin $4\nu$ signal appears on line 22. Lines 22, 25 then couple their respective signals to conventional phase splitters 31, 32 as shown. Each phase splitter produces two output signals, one having a phase identical with that of its input signal and the other differing in phase by 180° relative to the input signal.

Thus, lines 40, 41 emit signals corresponding to $+\sin 4\nu$ and $-\sin 4\nu$ respectively and lines 42, 43 make available signals of $+\cos 4\nu$ and $-\cos 4\nu$ respectively, which latter change to $-\cos 4\nu$ and $+\cos 4\nu$ respectively 18 times per second. These four lines then conduct their respective signals to four associated electronic switches 46–49 as shown.

Figure 3:
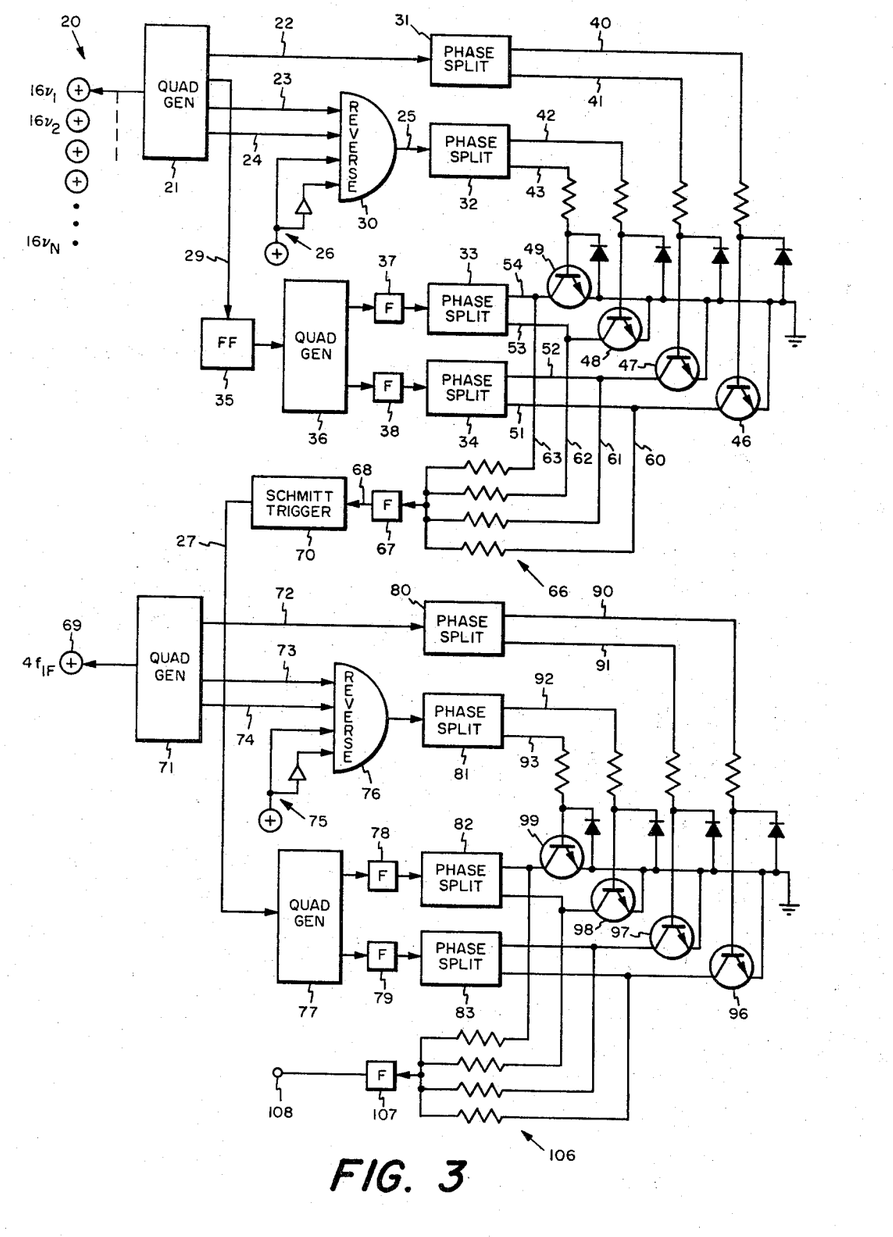
FIG. 3 is a block diagram of a system for generating simulated Doppler lobe center frequencies.

As shown by way of example in FIG. 3, each switch comprises a conventional transistor adapted to pull its collector voltage to ground (emitter) when a suitable current is applied to its base. In other words, the signals available on lines 51–54, respectively, will be switch modulated by the signals being impressed upon the base circuit in each transistor along lines 40–43, respectively.

The modulation signals at each collector are derived beginning on conductor 29 whereby the voltage obtained from quadrature generator 21 and having a frequency $4\nu$ (its phase not being critical at the moment) is applied to a conventional flip-flop means 35. Flip-flop 35 divides the incoming signal frequency in half and its output signal having a frequency content $2\nu$ is then fed to a second quadrature generator 36. It should be emphasized at this point, that the trigonometric labels applied to each respective signal merely identifying the phase of that signal with the phase of another signal of like frequency. This convention will be adhered to throughout the discussion unless and until indicated otherwise. Generator 36 functions in a manner identical to quadrature generator 21, hence one of its flip-flop outputs, sin $\nu/2$, is fed to low-pass filter 37 whereas the corresponding output from its other flip-flop, cos $\nu/2$, is fed to a similar low-pass filter 38.

As is well-known, any complex wave form may be expressed by its Fourier expansion. Thus, the square wave output of generator 36, sin $\nu/2$, may be restated in the form:

$$4/\pi[\sin 2\pi(\nu/2)t - \tfrac{1}{3}\sin 2\pi(3\nu/2)t + \tfrac{1}{5}\sin 2\pi(5\nu/2)t \ldots] \quad (6)$$

where the first term represents a fundamental frequency component and the succeeding terms correspond to the Fourier harmonics which when added to the fundamental produce the square wave represented herein as sin $\nu/2$. The cos $\nu/2$ wave form may be treated in similar fashion. Each filter 37, 38, is adapted to strip the harmonics from its respective square wave input signal and leave only smoothed sinusoidal fundamental outputs of sin $\nu/2$, cos $\nu/2$ respectively. These signals are then applied to phase splitters 33, 34 respectively and consequently yield four outputs on lines 51–54 corresponding to $+\sin \nu/2$, $-\sin \nu/2$, $+\cos \nu/2$ and $-\cos \nu/2$ respectively, which latter are subsequently applied to the collector circuits in each transistor switch 46–49, respectively, as shown. Here they are switch modulated by the square waves having frequencies of $4\nu$ which are being fed into each transistor base.

Figure 4:
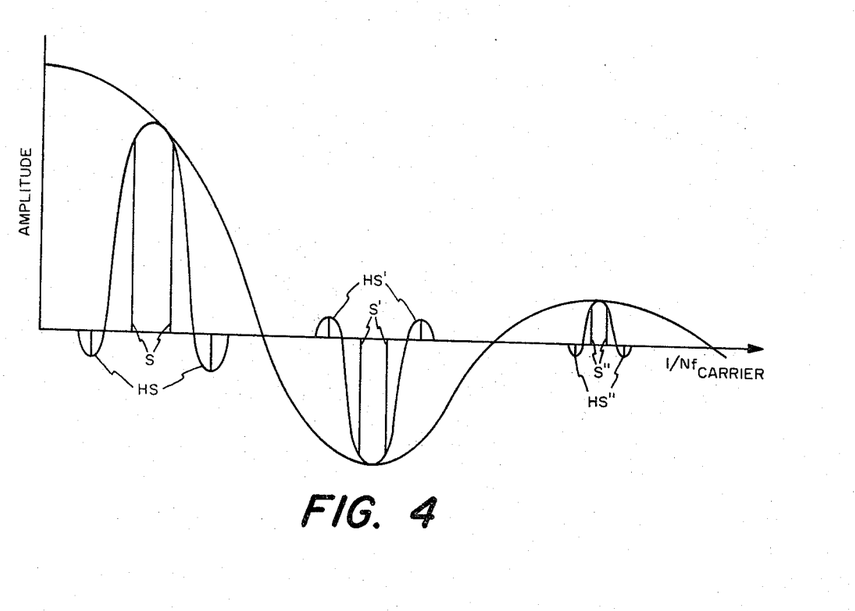
FIG. 4 is a graphical plot showing the spectral products produced by switch modulation.

In order to more fully understand this modulation process, consider the spectral frequency distribution in the modulated output signal corresponding to each of the switches 46–49. From general modulation theory we know that each spectral distribution may be represented by a graphical plot of the function $$\sin x/x \quad (7)$$

as shown, for example, in FIG. 4. Assuming no pre-filtering, a pair of first order double sidebands S surround the carrier frequency ($4\nu$) with each sideband being separated therefrom by the modulation frequency ($\nu/2$). In addition, there exists higher order double sideband pairs represented by the reference characters S' and S'', at odd multiples of the carrier frequency. Actually, there are many higher orders of double sidebands, however, only two are being shown for simplicity of presentation. Finally, each double sideband pair has associated therewith harmonic sideband products of the modulation frequency designated by the reference characters HS, HS' and HS'', respectively, as shown.

Leaving FIG. 4 for a moment, the modulation products of each switch 46–49 may be expressed mathematically as follows:

$$F_1 \quad 2\pi(4\nu)t\left[-\sin 2\pi\left(\tfrac{\nu}{2}\right)t\right] \quad (8)$$

$$F_2 \quad 2\pi(4\nu)t\left[\sin 2\pi\left(\tfrac{\nu}{2}\right)t\right] \quad (9)$$

$$F_3 \quad 2\pi(4\nu)t\left[-\cos 2\pi\left(\tfrac{\nu}{2}\right)t\right] \quad (10)$$

$$F_4 \quad 2\pi(4\nu)t\left[\cos 2\pi\left(\tfrac{\nu}{2}\right)t\right] \quad (11)$$

where $F_1$–$F_4$ represent the respective switching functions associated with the square wave frequencies being fed into each transistor base. If the voltage wave forms corresponding to the modulation products identified by Equations 8–11 were to be viewed physically such as, for instance, on an oscilloscope they would appear as shown respectively in FIGS. 5A, 5B, 5D and 5E. In this connection, it is important to note that the wave forms in the latter two figures have a quadrature phase relationship relative to the voltage wave forms in the former two figures respectively.

Through a Fourier expansion of each square wave switching function, we obtain the following:

$$F_1 \quad 2\pi(4\nu)t = \tfrac{1}{2} - \tfrac{2}{\pi}\Big[\sin 2\pi(4\nu)t$$
$$-\tfrac{1}{3}\sin 2\pi(12\nu)t + \tfrac{1}{5}\sin 2\pi(20\nu)t \ldots\Big] \quad (12)$$

$$F_2 \quad 2\pi(4\nu)t = \tfrac{1}{2} + \tfrac{2}{\pi}\Big[\sin 2\pi(4\nu)t$$
$$-\tfrac{1}{3}\sin 2\pi(12\nu)t + \tfrac{1}{5}\sin 2\pi(20\nu)t \ldots\Big] \quad (13)$$

$$F_3 \quad 2\pi(4\nu)t = \tfrac{1}{2} + \tfrac{2}{\pi}\Big[\cos 2\pi(4\nu)t$$
$$-\tfrac{1}{3}\cos 2\pi(12\nu)t + \tfrac{1}{5}\cos 2\pi(20\nu)t \ldots\Big] \quad (14)$$

$$F_4 \quad 2\pi(4\nu)t = \tfrac{1}{2} - \tfrac{2}{\pi}\Big[\cos 2\pi(4\nu)t$$
$$-\tfrac{1}{3}\cos 2\pi(12\nu)t + \tfrac{1}{5}\cos 2\pi(20\nu)t \ldots\Big] \quad (15)$$

Now as indicated in FIG. 3, the respective modulation products represented in Equations 8–11 are applied to adding network 66 which functions to sum the products in such a manner as to produce a single sideband frequency component at the desired upper lobe frequency $Q_1$, as well as higher harmonics thereof.

Continuing with our mathematical analysis, the particular summing process in adder 66, may be expressed as the sum of two sums as follows:

$$S_1 = F_1 \quad 2\pi(4\nu)t\left[-\sin 2\pi\left(\tfrac{\nu}{2}\right)t\right]$$
$$+ F_2 \quad 2\pi(4\nu)t\left[\sin 2\pi\left(\tfrac{\nu}{2}\right)t\right] \quad (16)$$

$$S_2 = F_3 \quad 2\pi(4\nu)t\left[-\cos 2\pi\left(\tfrac{\nu}{2}\right)t\right]$$
$$+ F_4 \quad 2\pi(4\nu)t\left[\cos 2\pi\left(\tfrac{\nu}{2}\right)t\right] \quad (17)$$

$$S_1 + S_2 = S_3 \quad (18)$$

Figure 5A:
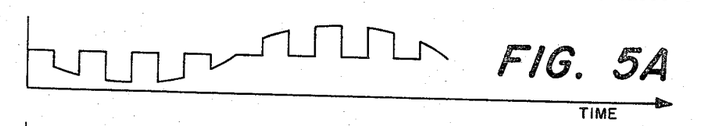
FIGS. 5A–5H are graphical representations of the voltage waveforms of various modulation products.
Figure 5B:
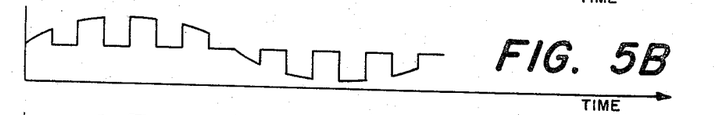

Physically speaking, Equations 8 and 9 tell us that $S_1$ is equal to the sum of the modulation products of switches 46 and 47, or stated differently, to the sum of the voltage wave forms shown in FIGS. 5A and 5B.

Figures 5C, 5D, 5E, 5F:
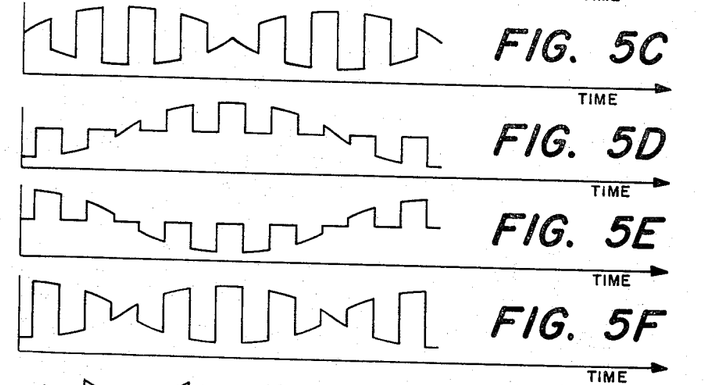

By substituting Equations 12, 13 into Equation 16 we get:

$$S_1 = -\frac{1}{2}\sin 2\pi\left(\frac{\nu}{2}\right)t + \frac{2}{\pi}\sin 2\pi\left(\frac{\nu}{2}\right)t\left[\sin 2\pi(4\nu)t\right.$$
$$\left. -\frac{1}{3}\sin 2\pi(12\nu)t + \frac{1}{5}\sin 2\pi(20\nu)t \ldots\right]$$
$$+\frac{1}{2}\sin 2\pi\left(\frac{\nu}{2}\right)t + \frac{2}{\pi}\sin 2\pi\left(\frac{\nu}{2}\right)t\left[\sin 2\pi(4\nu)t\right.$$
$$\left. -\frac{1}{3}\sin 2\pi(12\nu)t + \frac{1}{5}\sin 2\pi(20\nu)t \ldots\right] \quad (19)$$

which in turn reduces to $$S_1 = \frac{4}{\pi}\sin 2\pi\left(\frac{\nu}{2}\right)t\left[\sin 2\pi(4\nu)t - \frac{1}{3}\sin 2\pi(12\nu)t\right.$$
$$\left. + \frac{1}{5}\sin 2\pi(20\nu)t \ldots\right] \quad (19a)$$

where $S_1$ is now equal to the Fourier expansion of the voltage wave form depicted in FIG. 5C. Note further that the first order terms $$\left[\frac{1}{2}\sin 2\pi\left(\frac{\nu}{2}\right)t\right]$$

in each expansion on the right side of Equation 19 have cancelled out. This indicates that by adding the modulation products of switches 46 and 47 together a new modulation product is produced (i.e., the voltage wave form of FIG. 5C) having a suppressed modulation frequency fundamental and comprising only higher order harmonics in the form of double sidebands.

Similarly, Equations 10 and 11 indicate that $S_2$ represents the summing together of the modulation products of switches 48 and 49 and therefore the addition together of the voltage wave forms shown in FIGS. 5D and 5E. Thus, substituting Equations 14, 15 into Equation 17 will yield $$S_2 = \frac{4}{\pi}\cos 2\pi\left(\frac{\nu}{2}\right)t\left[\cos 2\pi(4\nu)t - \frac{1}{3}\cos 2\pi(12\nu)t\right.$$
$$\left. + \frac{1}{5}\cos 2\pi(20\nu)t \ldots\right] \quad (20)$$

which corresponds to the voltage wave form depicted in FIG. 5F.

From Equations 19a and 20 it can be learned that the addition together of the modulation products of switches 46 and 47 yields a voltage wave form having double sideband frequency components identical to those produced by the addition together of the modulation products of switches 48 and 49, the only difference being the 90° phase departure between the former and the latter as indicated by the corresponding sin, cos terms in Equations 19a and 20 and as graphically shown by comparing FIG. 5C with FIG. 5F.

Now by substituting Equations 19a and 20 into Equation 18 we obtain:

$$S_3 = \frac{4}{\pi}\sin 2\pi\left(\frac{\nu}{2}\right)t\,[\sin 2\pi(4\nu)t$$
$$-\frac{1}{3}\sin 2\pi(12\nu)t + \frac{1}{5}\sin 2\pi(20\nu)t \ldots ]$$
$$+$$
$$-\frac{4}{\pi}\cos 2\pi\left(\frac{\nu}{2}\right)t\,[\cos 2\pi(4\nu)t$$
$$-\frac{1}{3}\cos 2\pi(12\nu)t + \frac{1}{5}\cos 2\pi(20\nu)t \ldots [ \quad (21)$$

Figure 5G:
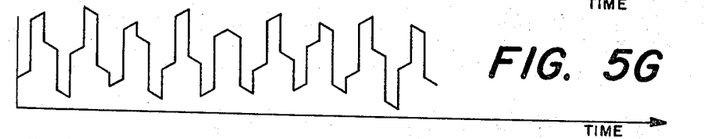

This equation defines the complex wave form graphically represented in FIG. 5G. Furthermore, observe that the first order term on the right side of Equation 21 is in the form $$\sin 2\pi\left(\frac{\nu}{2}\right)t\,\sin 2\pi(4\nu)t - \cos 2\pi\left(\frac{\nu}{2}\right)t\,\cos 2\pi(4\nu)t \quad (22)$$

which through the trigonometric equivalent of the cos of the sum of two angles is equal to $$-\cos 2\pi\left(\frac{\nu}{2}+4\nu\right)t \quad (23)$$

Making the appropriate substitution of Equation 23 into Equation 21 we arrive at $$S_3 = \frac{4}{\pi}\left[-\cos 2\pi\left(\frac{\nu}{2}+4\nu\right)t + \frac{1}{3}\cos 2\pi\left(\frac{\nu}{2}+12\nu\right)t\right.$$
$$\left. -\frac{1}{5}\cos 2\pi\left(\frac{\nu}{2}+20\nu\right)t \ldots\right] \quad (24)$$

which is the mathematical statement of a complex wave form having a fundamental single sideband frequency component at $(4\nu+\nu/2)$ as well as harmonics thereof. Rearranging the latter we get $4(\nu+\nu/8)$, it being noticed with reference to FIG. 2 that the term inside the parenthesis is equal to the desired upper lobe frequency being simulated ($Q_1$) minus $f_{IF}$.

Finally, as shown in FIG. 3, the complex wave form identified by Equation 24 and shown graphically in FIG. 5G is passed through a post-modulation filtering network 67 wherein the higher order terms or Fourier frequency harmonics are stripped from the signal leaving only a smoothed sinusoid at the fundamental frequency, $$4\left(\nu+\frac{\nu}{8}\right)$$

Figure 5H:
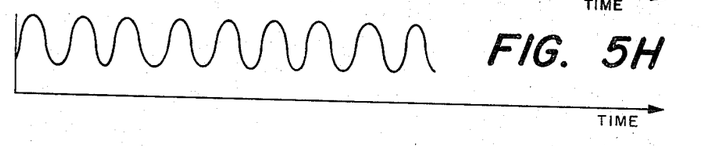

The latter is shown in FIG. 5H.

To recapitulate with reference again made to FIG. 4, the modulation frequency signals ($\nu/2$) are pre-filtered in filters 37, 38 to prevent the appearance of the harmonic sidebands HS, HS' and HS'' in the final desired modulation product.

After modulation takes place, the modulation products of switches 46, 47 and switches 48, 49 are added together respectively, suppressing the modulation frequency and leaving only two signals in quadrature with each other although each of the two signals still exhibit the frequency distribution shown in FIG. 4, namely, first order and higher order double sideband pairs at S, S' and S'', respectively. These two signals are then added together, and since they are in quadrature with each other, the lower sideband in each corresponding order sideband pair is suppressed producing a final modulation product having single sideband frequency components at odd multiples of the carrier frequency ($4\nu$). This final modulation product is then filtered in network 67 to remove the harmonic single sidebands at S', S''. As a result, the filter output signal comprises only a single sideband frequency component at S equal to $$4\left(\nu+\frac{\nu}{8}\right)$$

and is therefore the analog of the upper lobe frequency $Q_1$ shown in FIG. 2.

It will be remembered that the purpose of the logic operations in reversing switch 30 was to invert the phase of the $-\cos 4\nu$ signal on line 42 relative to the $+\cos 4\nu$ signal on line 43 at the lobing frequency rate of 18 Hz. The effect of this signal inversion on the modulation process occurring in switches 46–49 is merely to flip the voltage wave forms in FIGS. 5D, 5E and 5F over on their axis. Now when the quadrature related double sidebands of FIG. 5F are added to the corresponding double sidebands of FIG. 5C in accordance with Equation 18, the expression for the voltage waveform in FIG. 5G becomes $$S_3 = \frac{4}{\pi}\left[\cos 2\pi\left(\frac{\nu}{2}-4\nu\right)t - \frac{1}{3}\cos 2\pi\left(\frac{\nu}{2}-12\nu\right)t\right.$$
$$\left. + \frac{1}{5}\cos 2\pi\left(\frac{\nu}{2}-20\nu\right)t \ldots\right] \quad (25)$$

It will be appreciated that Equation 25 therefore identifies a voltage wave form having a single sideband frequency fundamental at $$4\nu - \frac{\nu}{2}$$

or $$4\left(\nu - \frac{\nu}{8}\right)$$

in addition to harmonics thereof. Accordingly, the output signal of filter network 67 during each inverting operation of reversing switch 30 comprises a smooth single frequency sideband at $$4\left(\nu - \frac{\nu}{8}\right)$$

which corresponds to the desired lower lobe frequency being simulated, $Q_2$, as shown in FIG. 2.

Returning to FIG. 3, it should now be clear that a sinusoidally varying voltage appears on line 68 having two discrete frequency values periodically alternating in time between $$4\left(\nu + \frac{\nu}{8}\right)$$

and $$4\left(\nu - \frac{\nu}{8}\right)$$

at the rate of 18 Hz. This voltage is then applied to a conventional Schmitt trigger 70 which converts the input sinusoid into a square wave output of like frequency and phase and couples the same along line 27 to another quadrature generator 77.

Figure 6A:
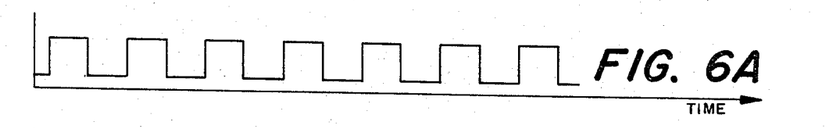
FIGS. 6A–B are graphical representations of switch input voltage waveforms.
Figure 6B:
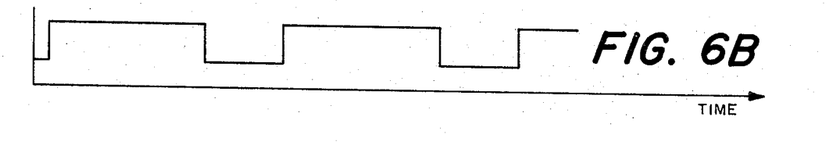

A conventional voltage source indicated by reference character 69 supplies a continuous train of square waves at a frequency of $4f_{IF}$ and delivers the same to still another quadrature generator 71. The latter provides on line 72 an output signal, sin $f_{IF}$, and on lines 73, 74 output signals of $+\cos f_{IF}$ and $-f_{IF}$, respectively. Lines 73, 74 then conduct their respective signals to reversing switch 76. The latter functions in a manner analogous to that of reversing switch 30, although differing slightly in its rate of operation. That is, in order to simulate beam switching among two forwardly directed beams and one aft directed beam it is necessary to gate reversing switch 76 in synchronism with the gating of reversing switch 30 so that after switch 30 inverts its input signal four times at the lobing rate, switch 76 will invert its input signal and keep it inverted until switch 30 inverts two more times at the lobing rate. Switch 76 must then return to its noninverting state while switch 30 inverts four more times at the lobing rate and the cycle is repeated. This requirement is met by supplying reversing switch 76 with two split phase rectangular wave trains obtained from a suitable source 75, with each rectangular wave being related to the corresponding square wave input of reversing switch 30 as schematically represented in FIGS. 6A and 6B respectively. Now it will be noted that reversing switch 30 is responsive to both the leading and trailing edges of each pulse in FIG. 6A whereas reversing switch 76 is gated by the leading and trailing edge of each pulse in FIG. 6B. Thus, during the time interval when each pulse in FIG. 6B is high the output of switch 76 remains at $+\cos f_{IF}$ while reversing switch 30 inverts its output four times. By comparison, during the time interval when each pulse in FIG. 6B is down, the output of reversing switch 76 is inverted to $-\cos f_{IF}$ and reversing switch 30 inverts its output only twice. Observe further that the lobing reversing switch input has a frequency three times that of the beam switching reversing switch input which is thoroughly consistent with the choice of rates being simulated, namely, 18 Hz. for the lobing rate and 6 Hz. for the beam switching rate. Switch 76 thus alternately delivers the $+\cos f_{IF}$ and the $-\cos f_{IF}$ signals to phase splitter 81 at the latter rate although the cos $f_{IF}$ signal remains for an interval of time twice that corresponding to the $-\cos f_{IF}$ signal. The sin $f_{IF}$ signal on line 72 is fed directly from quadrature generator 71 to phase splitter 80. The outputs of the phase splitters 80, 81 comprising square wave signals of sin $f_{IF}$, $-\sin f_{IF}$, $\pm\cos f_{IF}$, $\mp\cos f_{IF}$, respectively, are conducted subsequently along lines 90–93 to the base circuits of transistor switches 96–99, respectively.

All of the while, the square wave $$4\left(\nu \pm \frac{\nu}{8}\right)$$

on line 27 serves as the clock input to quadrature generator 77 which in response thereto provides two output signals of sin $(\nu\pm\nu/8)$ and cos $(\nu\pm\nu/8)$ respectively. The latter signals are then passed through filter networks 78, 79, respectively, wherein the Fourier harmonics are stripped from each signal in the same manner discussed above relative to filters 37, 38, yielding smooth sinusoids at the fundamental frequencies of $(\nu\pm\nu/8)$. These sinusoids are then applied to phase splitters 82, 83 and the signal outputs therefrom, namely, sin $(\nu\pm\nu/8)$, $-\sin (\nu\pm\nu/8)$, cos $(\nu\pm\nu/8)$, $-\cos (\nu\pm\nu/8)$ are coupled to the collector circuits of transistor switches 96–99 as shown.

As one would begin to expect at this point the same single sideband modulation process described above relative to switches 46–49 again takes place in switches 96–99 and adder 106. Accordingly, the respective output signals of each last mentioned switch may be expressed as modulation products in the form $$F_1 \quad 2\pi\left(\nu \pm \frac{\nu}{8}\right)t[-\sin 2\pi(f_{IF})t] \quad (26)$$

$$F_2 \quad 2\pi\left(\nu \pm \frac{\nu}{8}\right)t[\sin 2\pi(f_{IF})t] \quad (27)$$

$$F_3 \quad 2\pi\left(\nu \pm \frac{\nu}{8}\right)t[-\cos 2\pi(f_{IF})t] \quad (28)$$

$$F_4 \quad 2\pi\left(\nu \pm \frac{\nu}{8}\right)t[\cos 2\pi(f_{IF})t] \quad (29)$$

which are summed in adding network 106 in a manner analogous to that expressed by Equations 16–18. The resulting output signal is then post filtered in filter network 107 to remove its single sideband harmonic components leaving a smooth sinusoidal voltage having discrete frequency contents alternating between $f_{IF}+\nu+\nu/8$ on the one hand and $f_{IF}+\nu-\nu/8$ on the other at the lobing frequency rate (18 Hz.). Moreover, due to the logic operation taking place in reversing switch 76 an additional alternating frequency switching component equal to the antenna beaming frequency rate (6 Hz.) is impressed upon the signal. The effect of this is to alternately add and subtract the upper lobe frequencies $\nu\pm\nu/8$ (as they alternate at 18 Hz.) from the simulated intermediate frequency $f_{IF}$ at the rate of 6 Hz. yielding $$f_{IF} \pm \left(\nu \pm \frac{\nu}{8}\right) \quad (30)$$

In other words, if one were to frequency analyze the voltage wave form appearing on line 108 every one-eighteenth of a second a signal having a frequency content of $$f_{IF} + \nu + \frac{\nu}{8}$$

would be detected, followed by $$f_{IF} + \nu - \frac{\nu}{8}, \quad f_{IF} + \nu + \frac{\nu}{8}$$

and $$f_{IF} + \nu - \frac{\nu}{8}$$

in that order. The asymmetrical wave form depicted in FIG. 6B then gates reversing switch 76, thereby changing the frequency of the signal on line 108 to $$f_{IF} - \nu - \frac{\nu}{8}$$

followed by $$f_{IF} - \nu + \frac{\nu}{8}$$

whereupon reversing switch 76 is gated once more and the foregoing sequence is repeated. Thus, line 108 provides a succession of discrete frequency signals corresponding to the lobe center frequencies $Q_1$–$Q_4$ designated in FIG. 2. Not to be overlooked is the fact that the simulated upper lobe frequencies $Q_1$, $Q_2$ alternately appear twice before the lower lobe frequencies $Q_3$, $Q_4$ alternately appear once, thus establishing an accurate simulation of the beaming and lobing characteristics inherent in the antenna signature illustrated in FIG. 1.

Figure 7:
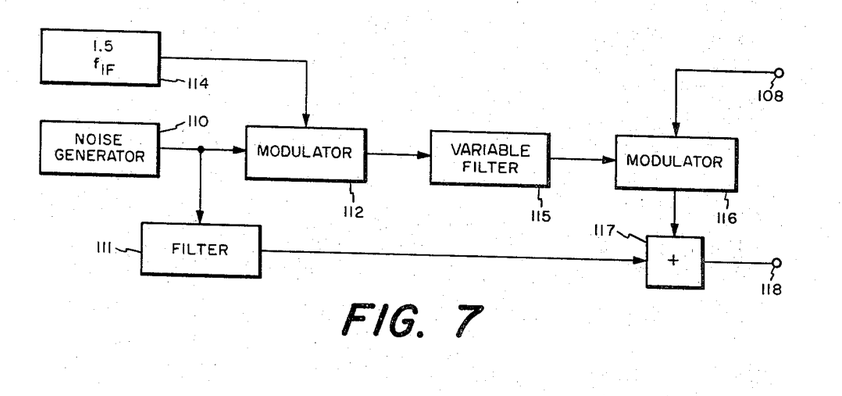
FIG. 7 is a block diagram of a system for generating simulated Doppler spectra and simulated Doppler receiver noise.
Figure 8A:
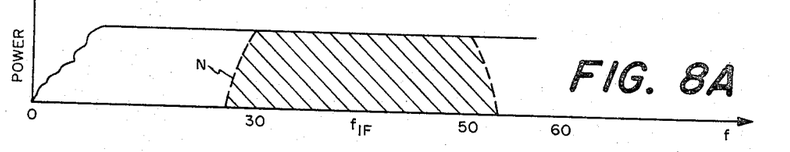
FIG. 8A–C are graphical representations in the frequency domain of the various signals processed in the system of FIG. 7.
Figure 8B:
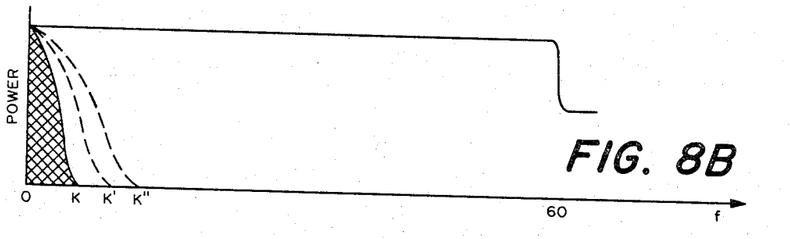

With reference now to FIG. 7 in conjunction with FIGS. 8A–C, apparatus for wrapping simulated Doppler spectra about each discrete frequency and for generating simulated receiver noise will be described. In FIG. 7 a noise generator 110 which may comprise, for example, a conventional noise diode, delivers flat (constant power density) broadband noise simultaneously to modulator 112 and bandpass filter network 111. The frequency distribution of the noise generator output signal is graphically represented in FIG. 8A. The filter, having a bandpass region roughly spanning the neighborhood between 30 and 50 kHz., samples the noise and emits an output signal having a spectral distribution indicated by the shaded area N in FIG. 8A. This output signal which is to be employed to simulate the receiver noise is then conducted along suitable path means to adder 117.

At the same moment, a local oscillating signal having a frequency content 1.5 $f_{IF}$ (about 60 kHz.) is derived from suitable source means 114 and applied to a conventional balanced modulator 112 wherein it modulates the frequency spectrum obtained from noise generator 110. The effect of this modulation is to fold the spectrum of FIG. 8A about the 60 kHz.) frequency point and to side-step the resulting modulation product to the zero frequency point as graphically represented in FIG. 8B. The modulated output signal is then passed through a variable low-pass filter network 115 which in turn yields an output signal having a spectral distribution designated by the cross-hatched area K in FIG. 8B. The broken lines K′, K″, in this figure, represent the various spectral widths obtainable by varying the filter network 115 and which latter may be used to simulate a variety of Doppler spectra corresponding to differing values of $\nu$, the simulated Doppler shift frequency. The output signal of filter 115 is then applied to a second conventional balanced modulator 116 wherein it is modulated by the discrete lobing frequencies made available on line 108 as previously described. More specifically, modulator 116 folds the carved out spectral slice K about the particular discrete frequency appearing on line 108 and consequently produces the simulated Doppler spectral lobe indicated in FIG. 8C by the cross-hatched area L. The broken lines in this figure represent the various simulated lobes produced at differing points in time by the correspondingly differing discrete lobing frequencies appearing serially on line 108. Finally, the output signal of modulator 116 is fed to adder 117 where it is added to the simulated noise output signal of filter network 111 to produce at output terminal 118 the composite signal shown in FIG. 8C.

Figure 8C:
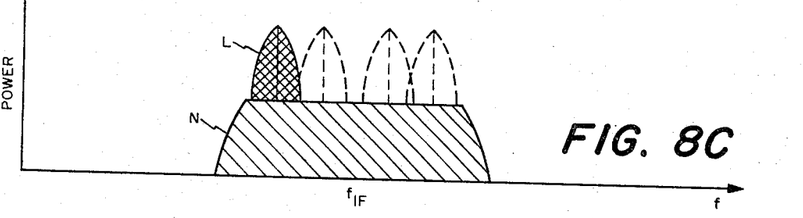

A comparison of FIG. 8C with FIG. 2 makes it apparent that the instant disclosure describes suitable and efficient means for accurately simulating the demodulated audio Doppler return obtainable from an antenna signature of the likes of that shown in FIG. 1.

And, although the present invention has been described with a degree of particularity for the purposes of illustration, it is to be understood that all equivalents, alterations and modifications within the spirit and scope of the present invention are herein meant to be included.

What is claimed is:

1. Apparatus for simulating the demodulated Doppler return signals resulting from an antenna signature having beaming frequency and lobing frequency modes, comprising:
    means for generating a signal at a predetermined carrier frequency,
    means for generating a signal at a predetermined modulation frequency,
    modulation means responsive to each of said aforementioned signals for deriving a single sideband modulation product having a fundamental frequency equal to the sum of said carrier frequency and said modulation frequency, said frequency fundamental being equal to $$\nu + \frac{\nu}{8}$$

where $\nu$ represents the simulated Doppler shift frequency,
    means for simulating the lobing frequency rate of said antenna signature, said lobing frequency simulating means being operative to alternately change the frequency content of said fundamental frequency to $$\nu - \frac{\nu}{8}$$

at a predetermined rate equal to said lobing frequency,
    means for generating a simulated intermediate frequency equal $f_{IF}$, where $f_{IF}$ represents the demodulated Doppler echo carrier frequency,
    second modulation means responsive to said simulated demodulated carrier frequency and said alternating fundamental frequency signal for modulating the former with the latter to yield a single sideband modulation product having discrete frequency values corresponding to $$f_{IF} + \nu \pm \frac{\nu}{8}$$

means for simulating the beaming frequency rate of said antenna, said beaming frequency simulating means being adapted to alternately change the frequency values of said last mentioned modulation product to $$f_{IF} - \nu \pm \frac{\nu}{8}$$

at a predetermined rate equal to said simulated beaming frequency,
    means responsive to said second modulation means for wrapping low pass noise about each discrete frequency to simulate a Doppler signal having a spectral frequency distribution, and
    means for mixing constant amplitude broadband noise with said simulated spectral Doppler signal.

2. The apparatus of claim 1 in which each of said first and second modulation means, comprises:
  means for deriving a pair of quadrature related signals from each modulation means input signal,
  a plurality of separate phase-splitter means responsive to each signal in each pair, respectively,
  a like plurality of switch modulator means respectively coupled to each phase splitter, and an adding network for summing together the output signals of all of said switch modulators.

3. The apparatus of claim 2, in which each modulation means further comprises first means for filtering the quadrature related pair of signals corresponding to the modulating frequency, and second means for filtering the output signal of said adding network.

4. The apparatus of claim 3 in which said means for simulating said beam switching frequency rate and said means for simulating said lobing frequency rate each comprises a logic gate adapted to invert at said predetermined rates, respectively, the phase of one of said signals in said quadrature related pair corresponding to the frequency being modulated.

5. The apparatus of claim 4 in which said beaming frequency logic gate comprises means for inverting the phase of said one of said signals after four inversions by said lobing frequency logic gate and for maintaining said one signal inverted during the next two inversions by said lobing frequency logic gate.

6. The apparatus of claim 2 in which said means of deriving a pair of quadrature related signals comprises a pair of flip-flops having feedback connections therebetween and a common clock input.

7. The apparatus of claim 1 in which said last two mentioned means, comprises:
  means for generating a local oscillating signal at a frequency of $1.5 f_{IF}$,
  means for generating a broad band spectrum of constant amplitude noise,
  first balanced modulator means responsive to the outputs of said noise generator means and said local oscillator means for deriving a low frequency noise spectrum,
  variable low-pass filter means responsive to said low frequency noise for emitting an output signal having a spectral frequency distribution,
  second balanced modulator means responsive to said variable filter and said second modulation means for wrapping said spectral signal about each of said discrete frequencies emitted by said second modulation means,
  adder means couple to said second balanced modulator, and
  band-pass filter means for sampling said noise generator output to derive a simulated receiver noise spectrum, said simulated receiver noise spectral signal being coupled to said adder means.

8. Apparatus for synthesizing discrete frequency signals, comprising:
  voltage source means for supplying a periodically varying signal,
  first quadrature generator means coupled to said source means for emitting a pair of output signals at a first preselected frequency, said signals in said pair differing in phase by 90°,
  phase splitter means responsive to each signal in said pair for producing two pair of split phase first preselected frequency signals in quadrature phase relation with one another,
  voltage source means for supplying a second periodically varying signal,
  second quadrature generator means responsive to said second periodically varying signal for producing a pair of quadrature phase related signals at a second preselected frequency,
  first filter means responsive to said second quadrature generator for removing the harmonic frequency contents in said second preselected frequency signals,
  second phase splitter means coupled to said first filter means for emitting two pair of split phase second preselected frequency signals in quadrature phase relation with one another,
  a plurality of modulators coupled to said first and second phase splitter means for switch modulating each of said first preselected frequency signals with each of said second preselected frequency signals respectively, said modulation yielding a plurality of signals comprising double sideband modulation products in quadrature phase relation with one another,
  adder means common to all of said modulators for summing said double sideband modulation products together to produce a final modulation product having a discrete single sideband fundamental frequency component equal to the sum of said first preselected frequency and said second preselected frequency and including additional single sideband frequency components corresponding to the higher harmonics of said discrete fundamental, and
  second filter means responsively associated with said adder means for removing said higher harmonics from said final modulation product leaving only said discrete single sideband fundamental frequency component.

9. The apparatus of claim 8, further comprising:
  logical switch means for phase inverting one of said first quadrature generator output signals at a periodically recurring predetermined rate, said discrete single sideband fundamental frequency component being equal to the difference between said first preselected frequency and said second preselected frequency when said first quadrature generator output signal is phase inverted by said logical switch means.

References Cited

UNITED STATES PATENTS 3,329,953  7/1967  Adams et al. _______ 343—17.7

RODNEY D. BENNETT, *Primary Examiner.*

T. H. TUBBESING, *Assistant Examiner.*